J. J. GORMLEY AND E. L. THURBER.
MACHINE FOR PARING NUTS, &c.
APPLICATION FILED JAN. 7, 1920.
1,365,396.
Patented Jan. 11, 1921.
3 SHEETS—SHEET 1.
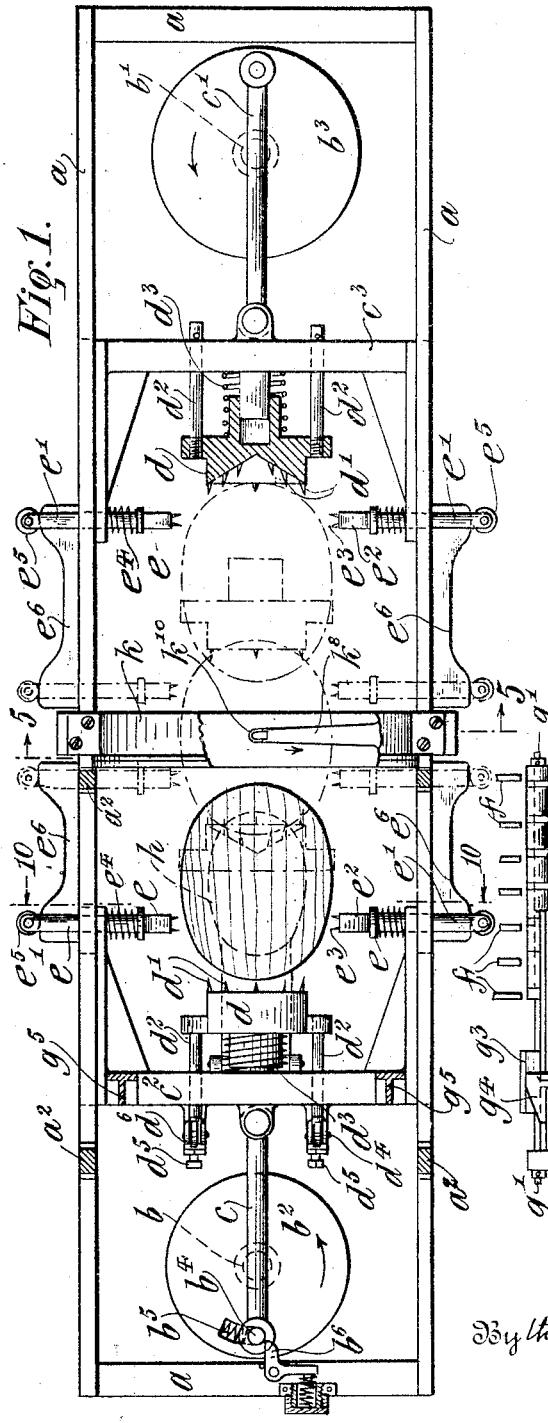
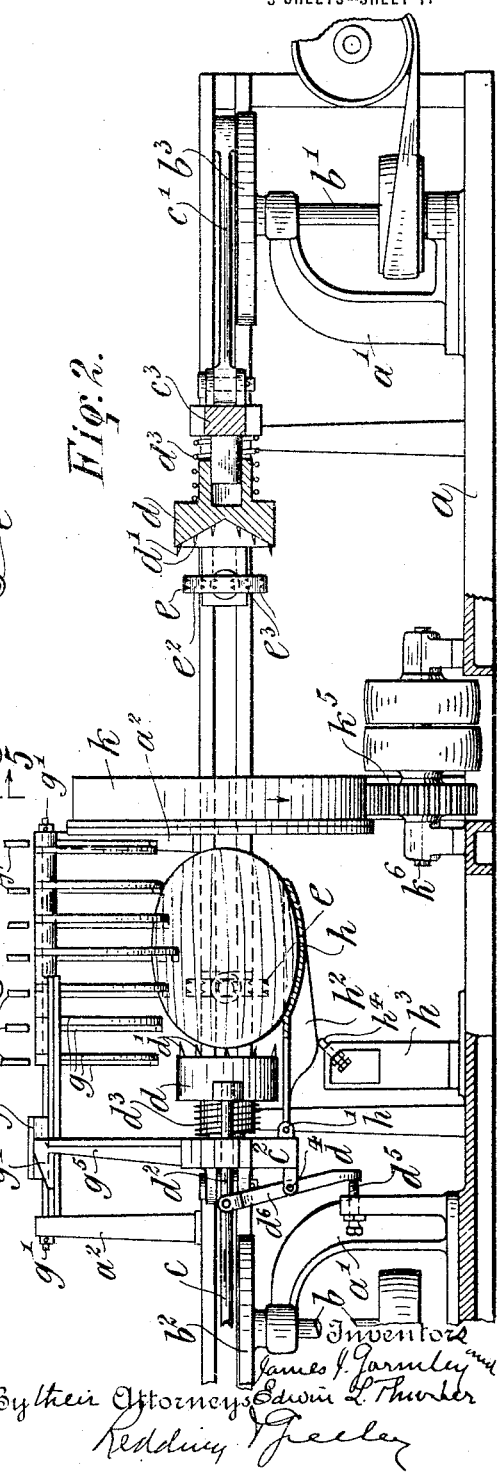

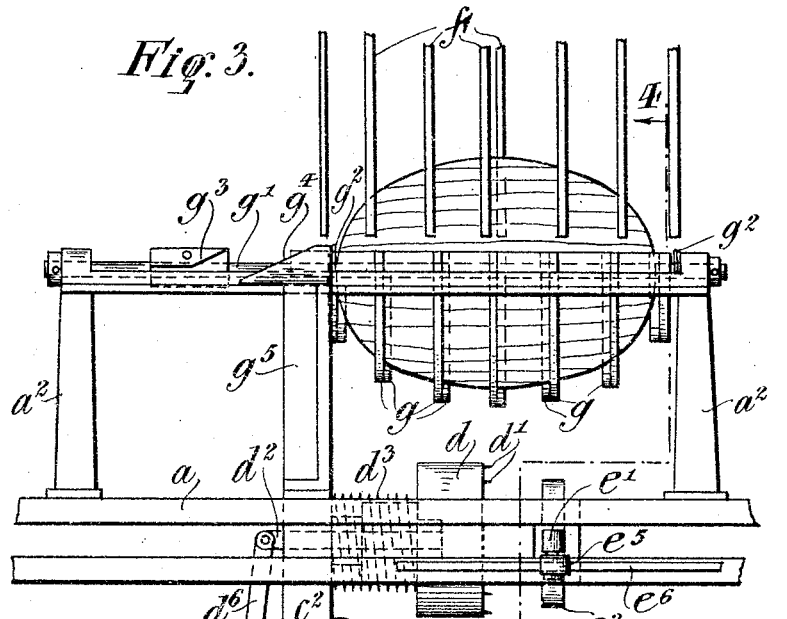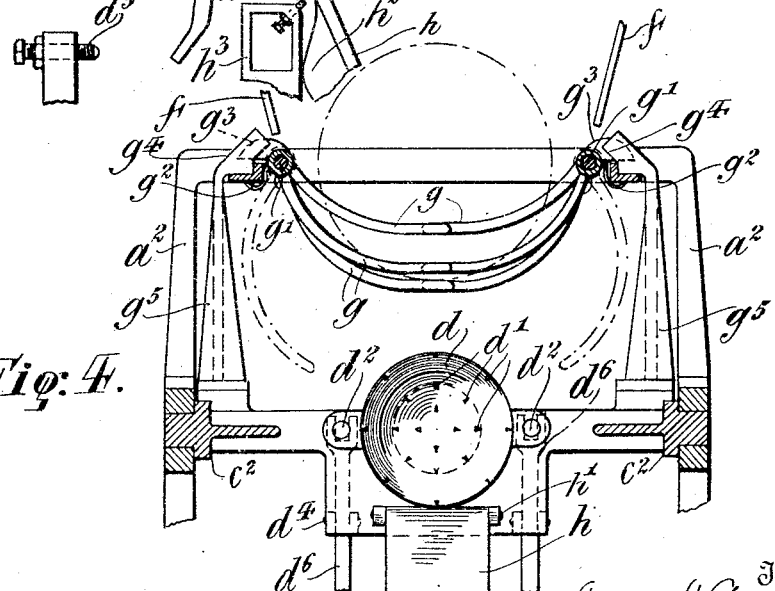

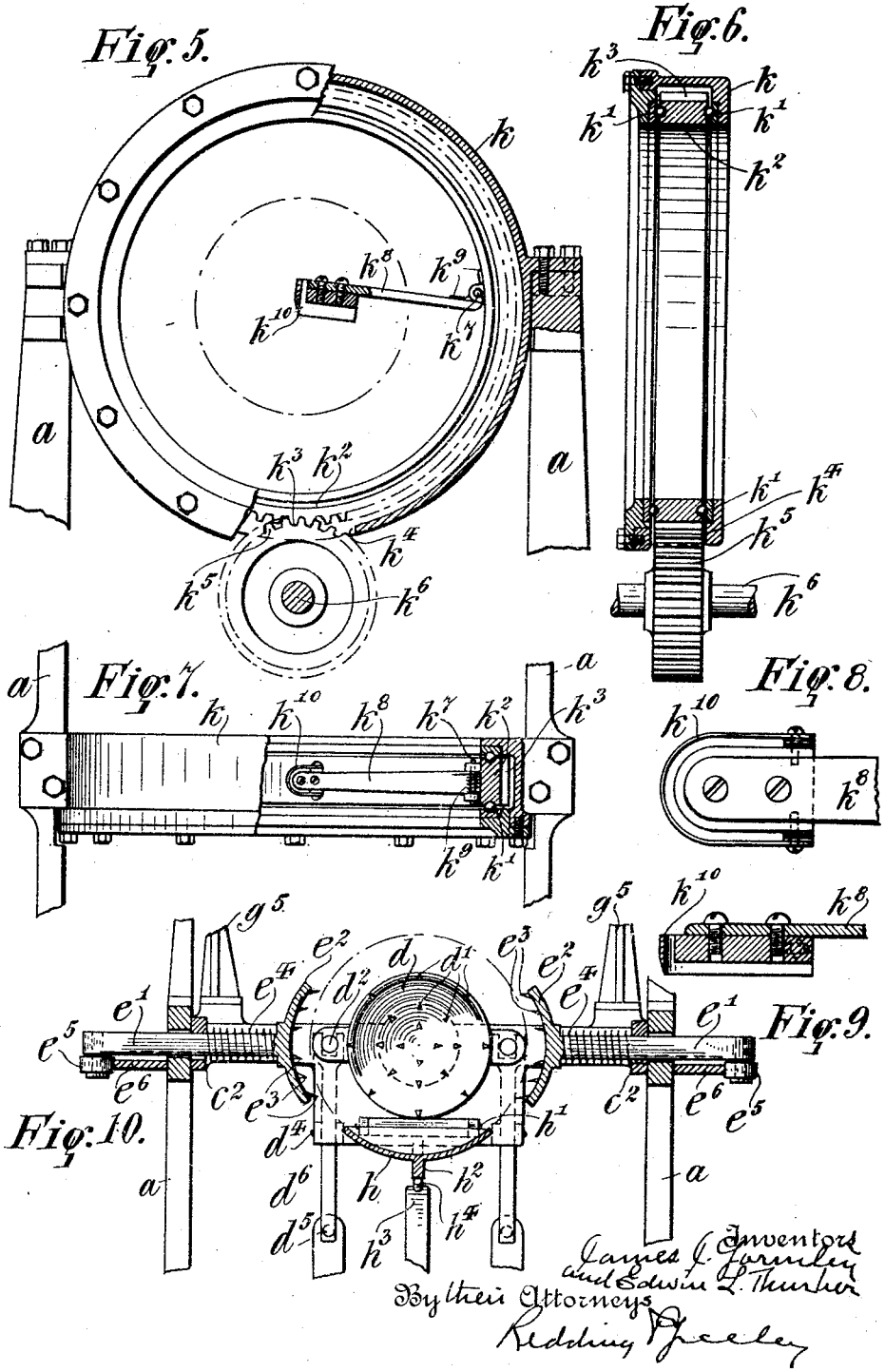

UNITED STATES PATENT OFFICE.

JAMES J. GORMLEY AND EDWIN L. THURBER, OF BROOKLYN, NEW YORK.

MACHINE FOR PARING NUTS, &c.

1,365,396.

Specification of Letters Patent.  Patented Jan. 11, 1921.

Application filed January 7, 1920. Serial No. 349,943.

*To all whom it may concern:*

Be it known that we, JAMES J. GORMLEY and EDWIN L. THURBER, citizens of the United States, residing in the borough of Brooklyn of the city of New York, in the State of New York, have invented certain new and useful Improvements in Machines for Paring Nuts, &c., of which the following is a specification, reference being had to the accompanying drawings, forming a part hereof.

Before the white meat of the cocoanut can be used for some of the purposes for which it is now used it must be freed from the brown skin which, inside of the hard shell, adheres closely to the meat. The machine which forms the subject of the present invention has been devised with particular reference to its use in the removal of this closely adhering, brown skin from the cocoanut meat after the hard shell has been cracked off but before the meat has been broken up, it being then in a form, which, if not spherical, is at least substantially circular in cross-section. Although devised with this particular purpose in view the machine, nevertheless, as will be understood, is capable of use for the removal of the outer skin or integument of any body which is substantially circular in cross-section and can be held in such a manner as hereinafter described for the action of the knife. In the machine chosen for illustration herein of the nature of the invention the knife is carried by an annulus and means are provided for grasping the nut or other body to be pared first at one side of its equator and then at the other side so that in the relative rotation of the annulus and the nut and in the relative axial movement of the two the knife is permitted to make contact with the exterior of the nut at every point from one pole to the other. In the machine shown the necessary relative movements are secured by rotation of the annular knife carrier and by axial movement of the nut. The invention will be explained more fully hereinafter with reference to the accompanying drawings in which the machine chosen as an embodiment of the invention is illustrated and in which—

Figure 1 is a top view of the machine, with some parts removed or broken away and some parts in horizontal section.

Fig. 2 is a view of the same in side elevation, with some parts broken away and some parts in vertical section.

Fig. 3 is a detail view in side elevation, illustrating particularly the devices for placing the nut in the holder.

Fig. 4 is a detail view in section on the irregular plane indicated by the broken line 4—4 of Fig. 3.

Fig. 5 is a detail view in section on the irregular plane indicated by the broken line 5—5 of Fig. 1.

Fig. 6 is a view of the knife carrier in vertical diametrical section with its driving pinion.

Fig. 7 is a top view of the knife carrier, partly in horizontal diametrical section.

Figs. 8 and 9 are detail views of the knife.

Fig. 10 is a detail view in section on the plane indicated by the broken line 10—10 of Fig. 1.

The working parts of the machine are supported upon a suitable frame $a$, at the ends of which, in suitable brackets $a'$, are mounted vertical shafts $b$, $b'$ driven by any convenient means and carrying at their upper ends crank disks $b^2$, $b^3$. The crank pin $b^4$ of the crank disk $b^2$ is preferably cushioned in the disk by a spring $b^5$ and co-acts with a spring-cushioned latch $b^6$, mounted on the frame $a$, this arrangement serving to check slightly the movement of the crank-pin at each revolution and then permit the quick forward movement of the crank-pin and of the slide and the chuck carried thereby so that the chuck shall more certainly engage the body to be operated upon. The two shafts $b$ and $b'$ are rotated in synchronism and the two crank-pins are set in opposition to each other so that they shall move toward and from each other. Each crank-pin is connected by a link $c$, $c'$ with a slide $c^2$, $c^3$, the two slides being mounted to reciprocate on the frame $a$. Each slide carries devices to grasp and hold the nut while it is being operated upon by the knife, such devices comprising, in each case, a chuck $d$ provided with spurs $d'$ and carried by rods $d^2$ which are guided in the slide $c^3$, the chuck being pressed yieldingly forward by a spring $d^3$. The face of each chuck is preferably concave, as shown, so that it may more certainly engage the end of the nut. The rods $d^2$ of the left-hand chuck may be connected to levers $d^6$, pivoted at $d^4$ on the slide $c^2$ and co-acting at their lower ends with adjustable stops $d^5$, so that at the end of the rearward or left-hand movement of the slide $c^2$ its chuck $d$ shall be drawn back with respect to the slide and at the beginning of the right-hand movement of the slide shall have a relative forward movement to bring it into certain engagement with the nut. Each slide $c^2$ and $c^3$ also carries lateral grippers adapted to engage the nut at points between its equator and the corresponding pole. As shown, each lateral gripper $e$ consists, as shown in Figs. 1 and 10, of a rod $e'$, mounted in the slide $c^2$, having at its inner end a preferably concave head $e^2$ armed with spurs $e^3$, pressed normally inward by a spring $e^4$, and carrying at its outer end an anti-friction roller $e^5$ which coöperates with a cam $e^6$ carried by a main frame. In the last of the rearward or left-hand movement of the slide $c^2$ its grippers $e$, through the contact of the rollers $e^5$ with the left-hand high parts of the cams $e^6$, are drawn apart in readiness to receive between them the nut to be pared. As the forward or right-hand movement of the slide $c^2$ begins the rollers $e^5$ pass from the high parts of the cams $e^6$ and the grippers are thereby permitted to engage the nut which has then been placed in position between them. As the slide $c^2$ approaches its extreme forward or right-hand position the grippers are drawn apart so as to release the nut. The grippers $e$ carried by the slide $c^3$ are similarly operated by the corresponding cams $e^6$ so as to engage the nut, at the other side of its equator, at the instant when it is released by the grippers of the slide $c^2$, to hold it during the rearward or right-hand movement of the slide $c^3$, and to release it at the end of such rearward or right-hand movement, thereby permitting the pared nut to leave the machine.

Each nut to be pared is delivered to the machine through a chute indicated by the bars $f$ in Figs. 2 and 3, dropping upon arms $g$, shown in Figs. 2, 3 and 4, which are secured to opposite shafts $g'$ mounted in standards $a^2$ supported by the frame $a$. Springs $g^2$, acting upon shafts $g'$, normally hold the arms $g$ in closed position, as shown in full lines in Fig. 4 and each shaft $g'$ carries a cam arm $g^3$ adapted to coöperate with a cam $g^4$ carried by a standard $g^5$ on the slide $c^2$, so that as the slide approaches the limit of its rearward or left-hand movement the arms $g$ are swung from the closed position shown by full lines in Fig. 4 to the open position shown by broken lines in the same figure and the nut, previously deposited on the arms $g$, is released and permitted to fall into position in front of the left-hand chuck $d$.

The nuts to be pared are substantially uniform in diameter and as each nut passes through the chute $f$ it is brought to position with its major axis substantially parallel with the axis of the machine. When the nut is released by the arms $g$ it falls in front of the chuck $d$ with its axis substantially in line with the axis of the chuck and is there supported temporarily by a spoon-shaped support $h$ which is pivoted at $h'$ on the slide $c^2$ and has on its under side a cam-like rib $h^2$ which rests, when the slide is in its extreme left-hand position, on a post $h^3$. When the forward or right-hand movement of the slide $c^2$ begins the chuck $d$, which as has been explained, was drawn back with respect to the slide as the latter reaches its extreme left-hand position, is released and driven forward by its spring $d^3$ so that the spurs $d'$ of the chuck are driven into the nut while the latter rests on the support $h$. As the right-hand movement of the slide continues the cam rib $h^2$ of the support $h$ passes from the post $h^3$ and the support drops at once to the position indicated in Fig. 3, leaving the nut supported by the chuck and by the grippers $e$ which meanwhile have closed upon the nut. For the purpose of permitting the support $h$ to be adjusted for nuts of different diameters an adjusting screw $h^4$ may be mounted in the post $h^3$.

In the forward or right-hand movement of the slide $c^2$ the nut, held by the chuck $d$ and the grippers $e$, is carried to the right until it meets the chuck $d$ carried by the slide $c^3$, being forced upon the spurs of the right-hand chuck. At the same time the grippers $e$ of the slide $c^3$ close upon the nut in a line between the equator and the right-hand end, and at the same time the grippers $e$ of the left-hand slide $c^2$ are withdrawn and the left-hand chuck $d$ is withdrawn, leaving the nut carried wholly by the right-hand chuck and grippers. As both chucks are pressed yieldingly forward by their respective springs $d^3$ and are capable of yielding rearwardly the chucks adapt themselves readily to nuts of different lengths.

Midway between the forward positions of the two slides is mounted, on the frame $a$, an annular casing $k$ which receives, in suitable ball bearings $k'$, an annulus $k^2$ which is formed externally with gear teeth, as at $k^3$, which are engaged, through an opening $k^4$ in the casing, by a pinion $k^5$ on a shaft $k^6$ which is rotated by any suitable means. To the inner side of the annulus $k^2$ is pivoted at any convenient point, as at $k^7$, an arm $k^8$ which is swung toward the center by a spring $k^9$ and carries at its free end a horse-shoe-shaped knife $k^{10}$.

It will now be understood that when the nut begins its forward or right-hand movement it is first brought in contact, at its right-hand pole, with the left-hand side of the knife and that as the nut continues its movement with respect to the plane of revolution of the knife, the knife swings outwardly and its curved edge is brought in contact successively with all portions of the right-hand half of the surface of the nut, which is then held by the left-hand chuck and grippers. As the nut passes through its middle position the right-hand grippers close upon the portion of the nut which has been pared and the left-hand grippers are withdrawn from the portion of the nut which has not been pared, leaving that portion free for the action of the knife. As the movement continues the knife acts upon the left-hand half of the nut, gradually swinging in toward the axis until it acts upon the left-hand pole of the nut. In this manner the entire surface of the nut is brought in contact with the knife and is thereby pared. When the paring has been completed the right-hand grippers are withdrawn and the pared nut is permitted to drop into a suitable receptacle.

It will be understood that various changes in details of construction and arrangement will be made to suit different conditions of use and to adapt the machine for operation on different bodies and that the invention is not to be limited to the precise details of construction and arrangement described herein.

We claim as our invention:

1. In a machine of the character described, the combination of devices to grasp between its equator and one pole the body to be operated upon, other devices to grasp the body between its equator and the other pole, means to operate said devices in alternation to grasp and release the body, a knife carrier, a knife mounted on said carrier to swing toward and from the axis of the body, means to effect relative rotation of the knife carrier and said devices and means to effect relative longitudinal movement in the line of the axis of the body of said devices and said knife carrier.

2. In a machine of the character described, the combination of devices to grasp between its equator and one pole the body to be operated upon, other devices to grasp the body between its equator and the other pole, means to operate said devices in alternation to grasp and release the body, a knife carrier, a knife mounted on said carrier to swing toward and from the axis of the body, means to effect relative rotation of the knife carrier and said devices and means to effect relative longitudinal movement in the line of the axis of the body of said devices and said knife carrier, said knife being bent in horseshoe-shape whereby in the relative movement of the knife and the body the knife may contact with every part of the surface of the body from pole to pole.

3. In a machine of the character described, the combination of a rotary annular knife carrier, a knife mounted on said carrier to swing toward and from the axis of rotation, a holder for the body to be operated upon and means to produce relative longitudinal movement in the line of the axis of the holder and the knife carrier.

4. In a machine of the character described, the combination of a rotary annular knife carrier, a knife mounted on said carrier to swing toward and from the axis of rotation, devices to grasp between its equator and one pole the body to be operated upon, other devices to grasp the body between its equator and the other pole, means to operate said devices in alternation to engage and release the body and means to produce relative longitudinal movement in the line of the axis of the knife carrier and said devices.

5. In a machine of the character described, the combination of a rotary annular knife carrier, a knife mounted on said carrier to swing toward and from the axis of rotation, opposite slides, means to reciprocate said slides toward and from each other, grippers carried by each of said slides to engage between its equator and the respective poles the body to be operated upon, and means to operate said grippers in alternation to engage and release said body.

6. In a machine of the character described, the combination of a rotary annular knife carrier, a knife mounted on said carrier to swing toward and from the axis of rotation, opposite slides, means to reciprocate said slides toward and from each other, spring-pressed grippers mounted on each of said slides to move toward and from the body to be operated upon, and fixed cams to coöperate with said grippers to cause the same to engage and release the body to be operated upon.

7. In a machine of the character described, the combination of opposed chucks adapted to engage the body to be operated upon, one of said chucks being mounted movably in its support, a spring tending to press said last named chuck forward with respect to its support, means to support said chucks and to reciprocate them toward and from each other, means whereby said spring-pressed chuck is drawn back with respect to its support as the support reaches its extreme rearward position and is permitted to move forward with respect to its support as the support begins its forward movement, a knife carrier and knife, and means to effect relative rotation of the knife carrier and the chucks.

8. In a machine of the character described, the combination of opposed slides, chucks carried by said slides and adapted to engage the body to be operated upon, crank disks and crank pins operatively connected to said slides respectively, the crank pin of one of said disks being mounted yieldingly in the disk, and a yielding detent to coöperate with said last named crank pin to check and release the same and thereby effect a quick movement of the corresponding slide.

9. In a machine of the character described, the combination of a frame, a rotary annular knife carrier mounted on said frame, a knife mounted thereon to swing toward and from the axis of the carrier, opposed slides mounted on said frame, means to reciprocate said slides toward and from each other, devices carried by said slides respectively to engage between its equator and its corresponding pole the body to be operated upon, and means to operate said devices in alternation to engage and release said body.

10. In a machine of the character described, the combination of a frame, a rotary annular knife carrier mounted on said frame, a knife mounted thereon to swing toward and from the axis of the carrier, opposed slides mounted on said frame, means to reciprocate said slides toward and from each other, devices carried by said slides respectively to engage between its equator and its corresponding pole the body to be operated upon, and cams mounted on the frame to coöperate with said devices to cause the same to engage and release the body to be operated upon.

11. In a machine of the character described, the combination of devices to grasp the body to be operated upon, mounted to swing on a horizontal axis above the plane of said devices to receive the body and hold it out of operative relation with said devices, and means to swing said arms to cause them to release the body and permit it to move by gravity into operative relation with said devices.

12. In a machine of the character described, the combination of a slide, devices carried by said slide to engage the body to be operated upon, swinging arms to receive said body and hold it out of operative relation with said devices, and means actuated by the movement of the slide to cause said arms to release the body and permit it to move into operative relation with said devices.

13. In a machine of the character described, the combination of a frame, a slide mounted to reciprocate on said frame, parallel shafts mounted on said frame and carrying arms to receive between them the body to be operated upon, devices carried by said slide to engage the body to be operated upon, said shafts having also operating arms, and cams carried by the slide to coöperate with said operating arms to effect the release of the body to be operated upon.

14. In a machine of the character described, the combination of devices to engage the body to be operated upon, means to deliver the body to be operated upon in operative relation with said devices, and a support to hold the body in position to be engaged by said devices, said support being mounted movably to support the body temporarily and then to move away from the body.

15. In a machine of the character described, the combination of a slide, devices carried by the slide to engage the body to be operated upon, a support pivotally mounted on the slide to hold the body temporarily in position for engagement with said devices, and means coöperating with said support in the movement of the slide to move said support to operative position and to permit it to move out of operative position.

This specification signed this 27th day of December, A. D. 1919.

JAMES J. GORMLEY.
EDWIN L. THURBER.